(12) United States Patent
Hanford

(10) Patent No.: US 7,076,937 B1
(45) Date of Patent: Jul. 18, 2006

(54) TWISTER FRUIT PICKER

(76) Inventor: Norris E. Hanford, 17670 Fonticello Way, San Diego, CA (US) 92128-1816

( * ) Notice: Subject to any disclaimer, the term of this patent is extended or adjusted under 35 U.S.C. 154(b) by 0 days.

(21) Appl. No.: 11/100,074

(22) Filed: Apr. 6, 2005

(51) Int. Cl.
*A01D 46/24* (2006.01)

(52) U.S. Cl. ..................................... 56/333

(58) Field of Classification Search ............... 56/333, 56/328.1, 332
See application file for complete search history.

(56) References Cited

U.S. PATENT DOCUMENTS

| | | | | |
|---|---|---|---|---|
| 204,748 A | * | 6/1878 | McConnell | 56/332 |
| 397,334 A | * | 2/1889 | Brooks | 56/337 |
| 583,567 A | * | 6/1897 | Cooney | 56/334 |
| 980,045 A | * | 12/1910 | Bastian | 56/333 |
| 2,507,655 A | * | 5/1950 | Welshans et al. | 56/333 |
| 4,034,542 A | * | 7/1977 | Loehr | 56/333 |
| 4,296,594 A | * | 10/1981 | Faulconer | 56/336 |
| 4,398,759 A | * | 8/1983 | Manola | 294/1.4 |
| 5,823,590 A | * | 10/1998 | Forrest et al. | 294/19.1 |
| 6,062,618 A | * | 5/2000 | Figueroa | 294/1.4 |

* cited by examiner

Primary Examiner—Árpád Fábián Kovács

(57) ABSTRACT

The twister fruit picker which comprises a pole mounted tool; with the tool having scissor like arms whose upper ends are opposing circular configured planes, which planes, when closed nearer to each other, will hold a fruit; and the opposing planes nearness to each other, being controlled by two opposing forces, originating from springs or elastic device, with one force stronger than the other one, and with device for controlling the strongest force. Such ability to control the configuration and size of the picker, when moving throughout a tree, makes it quick and easy to get on the fruit; and because fruit damage is minimal when fruit is twisted off, this invention is designed to allow twisting.

1 Claim, 2 Drawing Sheets

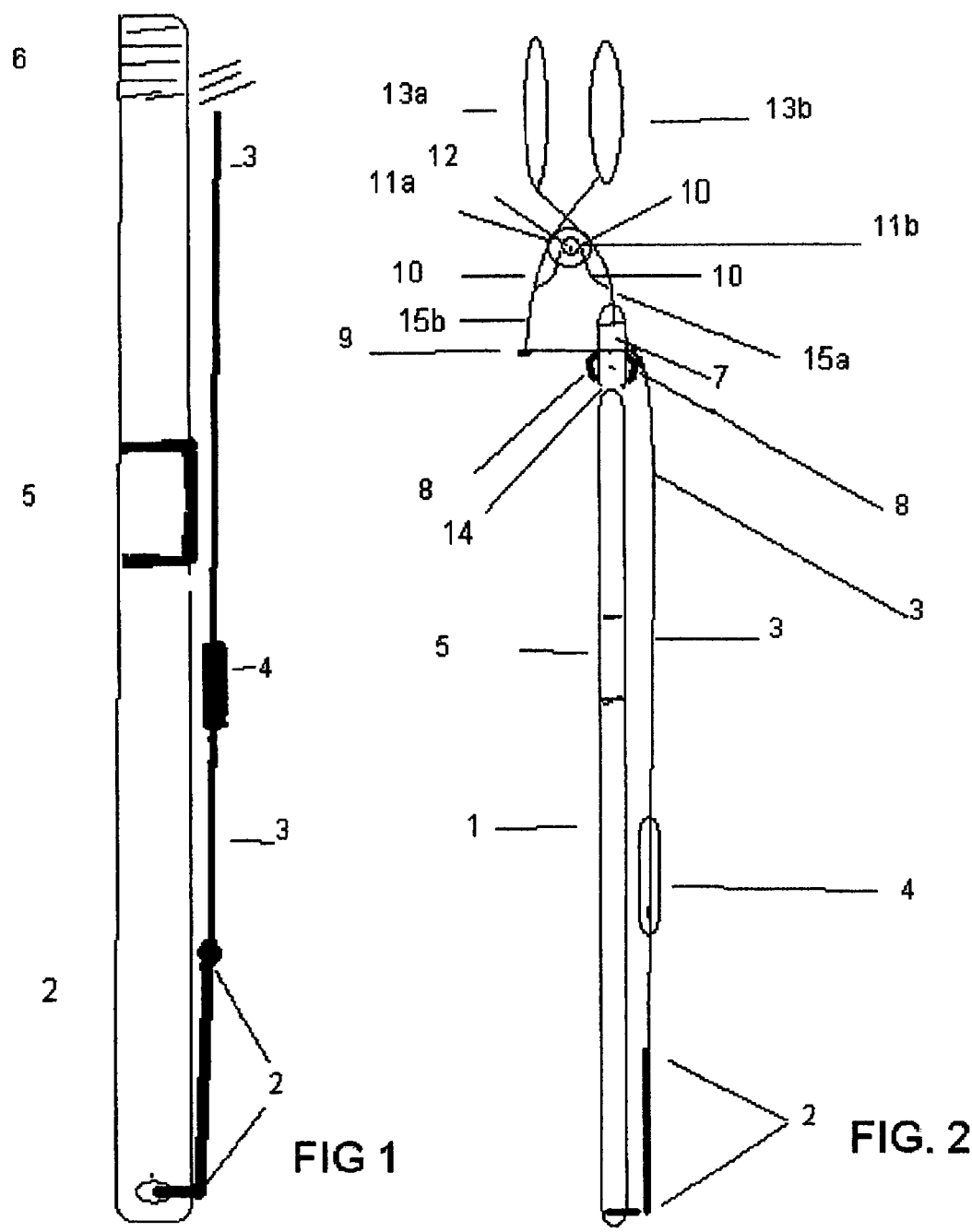

TWISTER FRUIT PICKER

BACKGROUND OF THE INVENTION

Families with back yard fruit trees such as, but not limited to, apple, peach, pear and orange, need a light weight, simple, and unobtrusive tool to retrieve their fruit easily without damaging either the fruit or their trees. Commercial pickers need a "clean up" picker that can easily get at hidden fruit. There are patented pickers that are designed to straddle the fruit stem so it can be cut, and pickers designed to get on the fruit in a manner where it can be pulled. The market offers wire baskets with extended tines designed to pull off the fruit. A pulling picker is usually difficult to get on the fruit and often it pulls the stem out, leaving a hole in the fruit. A stem cutting picker creates a difficult, if not impossible challenge in approaching and getting on the stem of many of the hanging fruit. I have read U.S. Pat. Nos. 6182,431 B1; 5,787,698; 5,724,799; 5,463,859; 5,280,697; 5,187,928; 4,959,949; 4,928,461; D301,825; and 4,835,955. I found no patent that would take precedence over the one I am submitting for approval. The ability to easily move a picker throughout the tree is essential for a good picker. That requires a small picker with no obtrusions. Although my picker takes just one fruit at a time, the ease and quickness of operation makes it possible to pick a large number of quality fruit in a short time.

BRIEF SUMMARY OF THE INVENTION

The Twister Fruit Picker is a picker tool mounted on a pole. The operator clamps the tool on a fruit after which the operator rotates the picker tool by rotating the attached pole which he holds in his hands.

The Twister Picker embodies in it's simplest form a vertically oriented scissor like construction, made preferably from light aluminum rod, and whose fruit engaging arms are opposing circles, sized to fit around fruit, but not so large as to be greater than the diameter of the fruit. The opposing fruit engaging rings are in the first instance held open by a spring incorporated in the tool head around the axis of the arms. In the second instance the fruit engaging rings are closed by tension from a rope which is attached to a twelve inch bungee cord, and said bungee cord being attached to the poles lower end. The default position of the opposing fruit engaging rings is closed because the contracting force of the bungee overcomes the torsion force of the spring which is trying to open the fruit engaging rings. When the operator pulls the top end of the bungee, thus stretching the bungee and creating slack in the rope, the opposing force of the spring, mounted on the axis of the arms, takes over and separates the opposing fruit engaging rings, at which time the operator straddles the fruit with the rings, whereupon the bungee is released by the operator thus causing the rings to close and create a firm grip on the fruit. It is then, optionally with two hands, that a simple rotation of the pole, which in turn rotates the tool head, releases the fruit either from the branch or from its stem, and the fruit, in the grasp of the rings can be lowered to ground level, where it is released by a stretching of the bungee, into a bucket.

Because the Twister Picker is moved through the branches with the opposing fruit engaging rings approximately closed, there is little interference from the branches while moving throughout the tree seeking the fruit. The overall dimensions of the tool head in the fruit seeking mode are about 2.75 inches in diameter at its largest point and a smooth twelve inches long. These characteristics make picking fast even though one fruit is picked at a time.

BRIEF DESCRIPTION OF THE SEVERAL VIEWS OF THE DRAWING

Other benefits and advantages of the novel twister fruit picker will be apparent from the following description, and the accompanying drawings, in which:

FIG. 1 is a perspective from the side of the pole with the rope tension means attached, and a view of the segment of rope ascending to pole top. Although the drawing shows the termination of the rope at pole top, it does not terminate, but continues on over the top of a sheave and fastens to one arm of the fruit engaging device.

FIG. 2 is a complete but reduced size view of the twister fruit picker.

DETAILED DESCRIPTION OF THE INVENTION

Figures 3, 4:
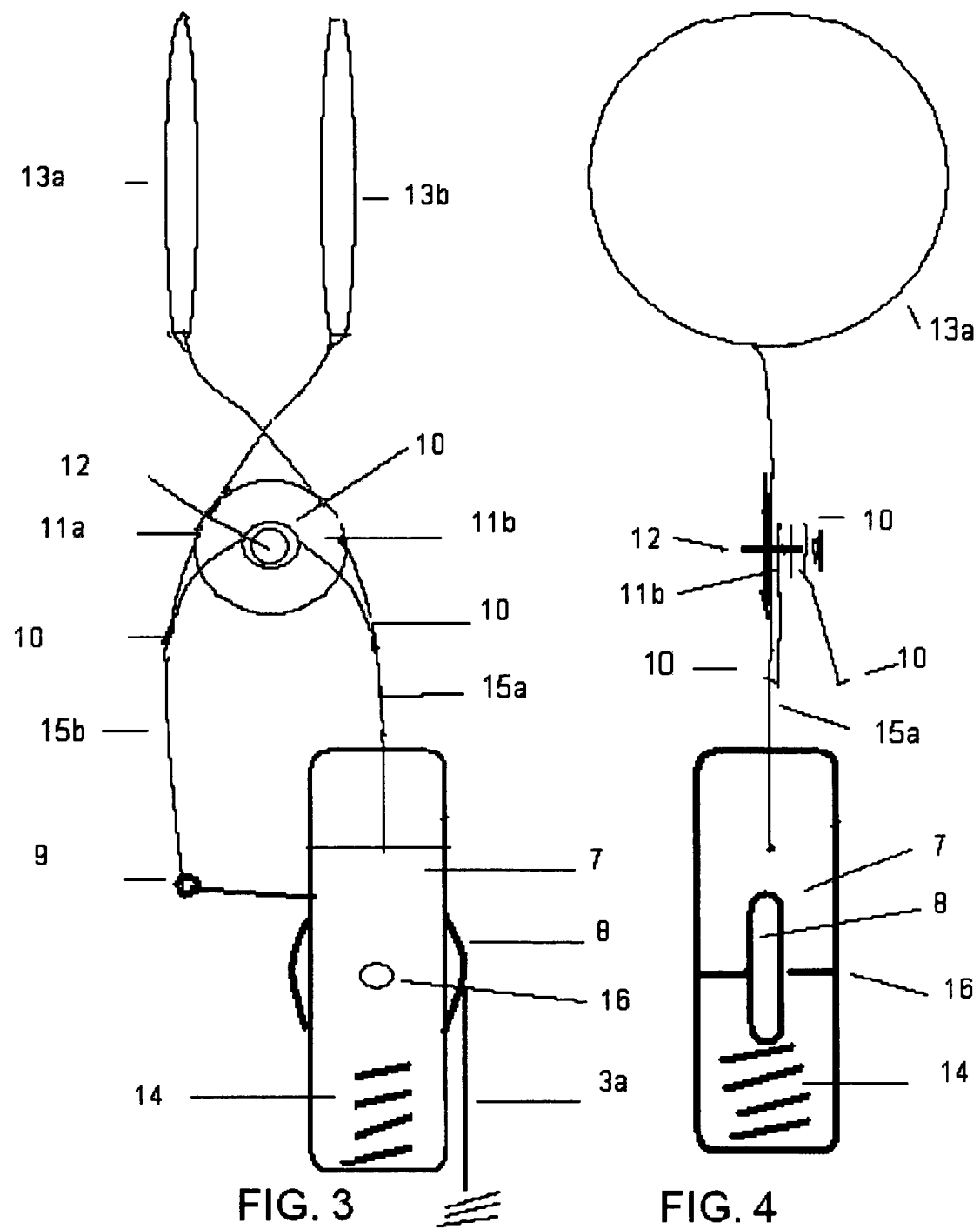
FIG. 3 shows in perspective, the parts of the twister fruit picker that mount on the pole top, which include a female threaded pole transition adaptor, said adaptor having a rope sheave built in, a sheave axle: and a partial view of the arm bearing that mates with the other arm bearing shown in FIG. 3, and the axis fitted to said bearing, a spring, and two fruit engaging rings on the arm's top end.
FIG. 4 shows in perspective one half of the twister fruit picker including the pole transition adapter, rotated 90 degrees clockwise from FIG. 2 perspective. In this view one can see more clearly the construction of the sheave installation in the adaptor, and another view of the bearing plate with its common axis around which the arms may rotate in order to open or close the fruit engaging rings at the upper end of the arm. Also seen is a clearer view of the spring that holds the fruit engaging rings open; providing that the bungee force doesn't overpower it.

As shown in the drawings, one form of the novel twister fruit picker includes a pole 1, preferably a telescoping pole 5, an approximate twelve inch length of bungee cord 2, one end of which is secured to the pole bottom and the opposite end attached to the bottom terminus of the rope 3, a hand grip mounted on said rope 4, and male threads 6.on said pole's upper end. Said pole threads 6, are mated to the transition adaptor 7, at female threads 14. The continuing rope 3, sourcing from pole 1, changes direction 90 degrees, going over the top of sheave 8 and connects with the bottom of arm 15a, at 9. It can be seen that arm 15a and 15b are each welded to circular plates 11a and 11b: said circular plates having holes bored in their center to accommodate an axis 12, allowing arm 15a to be revolved around said axis 12, to decrease or increase the distance between the opposing circular planes of the fruit engaging rings 13a and 13b.

For successful operation of the twister fruit picker, the rope 3, attached to arm 15a at 9, must be made sufficiently taut when tied to the bungee cord 2, so the tautness overcomes the action of spring 10, whose force is trying to open the fruit engaging rings 13a and 13b. This is the default condition. In this mode the twister fruit picker is small and smooth to slip through the boughs unencumbered. As the rings approach the fruit, the operator places one hand on the hand grip 4, pushing up toward the top of the pole 6 and stretching the bungee cord 2, thus slacking the rope and allowing the spring at 10 to take over and open the opposing fruit holding rings 13a and 13b, at which time the operator moves the rings 13a and 13b around the fruit, and releases the rope grip 4. The bungee 2, then again makes the rope 3, taut, thus clamping the fruit holding rings around the fruit tight enough so the operator can pull or twist the pole 1, using two hands on the pole to remove the fruit. Twisting is easy and one is rewarded by undamaged fruit, but there may be times when pulling will be tolerable. After freeing the fruit from the tree, the operator can lower the pole with the fruit firmly held in the fruit engaging rings 13a and 13b, position the fruit which is secured by the opposing rings 13a and 13b, over a bucket, relieve the tension of the bungee 2, by hand grip 4, and drop the fruit in the bucket.

Construction of the twister fruit picker can be as sophisticated as manufacturing can be, or as uncomplicated as a few simple tools, a vice, drill, hacksaw, and odd materials. The preferred embodiment of this invention is two one quarter inch aluminum rods approximately 13 inches in length, with circles 2½ inches in diameter 13a and 13b, formed on the upper end of each rod and each rod bent slightly to conform generally with the drawing 15a and 15b. A circular bearing plate approximately one inch in diameter 11a and 11b, welded on each of said rods 15a and 15b, approximately midway longitudinally, and positioned on the rods so that the plane of the bearing plate is 90 degrees to the plane of that rod's end circle. A torsion spring mounted on axis 12, to open rings 13a and 13b, a transition adaptor 7, which in this embodiment is the plastic handle used on a paint roller having female universal pole threads, and a sheave 8, recess, machined therein.

The Twister Fruit Picker was designed with a family and their back yard fruit trees in mind. However it should be of interest to larger growers too. Many fruits are difficult to access on the tree, but the twister picker, with its smooth and small profile can access where other pickers hang up in the branches, and once on the fruit it deftly spins the fruit off so it can be lowered to the ground without bruising. It is a perfect compliment for a family who wants to enjoy their fruit trees and use the fruit as it ripens on the tree or if they like, pick it all the same day.

It will be apparent that various modifications can be made in the particular fruit picking apparatus described in detail above, and shown with the drawings, within the scope of the invention. For example, the size, shape, and materials of the components can be changed to meet specific requirements. Also, the arrangement of the components can be modified to adapt to different requirement such as, but not limited, to fruit size. Therefore, the scope of the invention is to be limited only by the following claim.

What is claimed is:

1. A twister fruit picker apparatus mounted on an operator hand held pole, the apparatus including:
    two upright substantially similar crossing arms, each arm having upper lower ends, and between the ends is a midpoint with a common axis, wherein the arms are rotated about the axis;
    each upper end of the arms include substantially identical fruit holding rings of circular shape, wherein the rings define parallel surfaces in both fruit gripping and straddle positions, and wherein the rings are capable of holding the fruit while being lowered from a fruit tree;
    wherein in the fruit gripping position the rings are moved toward each other, and in the fruit straddle position the rings are moved away from each other;
    at the midpoint of the arms a spring is connected, wherein the spring is biasing the arms and rings into the straddle or open or moving away position;
    a rope is connected to one of the end of the arms, passes over a sheave mounted on an upper end of the pole, and further connected to a bungee cord at a lower end of the pole, wherein the cord's biasing force is greater than a biasing force of the spring;
    wherein a substantial stretching of the cord slackens the rope and the spring biasing force is capable of positioning the rings into the straddle or open position, and vice versa, when the cord is not stretched the biasing spring force is less than the force exerted by the cord, so that the arms and rings are moved closer to each other into the fruit gripping position.

* * * * *